US012572795B2

(12) United States Patent
Gangi Reddy et al.

(10) Patent No.: US 12,572,795 B2
(45) Date of Patent: Mar. 10, 2026

(54) ANSWER SPAN CORRECTION

(71) Applicant: International Business Machines Corporation, Armonk, NY (US)

(72) Inventors: Revanth Gangi Reddy, Hyderabad (IN); Rong Zhang, Syosset, NY (US); Md Arafat Sultan, Croton-on-Hudson, NY (US); Efsun Kayi, Bedford Corners, NY (US); Avirup Sil, Hopewell Junction, NY (US); Robert Todd Ward, Croton-on-Hudson, NY (US); Vittorio Castelli, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 17/090,724

(22) Filed: Nov. 5, 2020

(65) Prior Publication Data

US 2022/0138559 A1 May 5, 2022

(51) Int. Cl.
*G06N 3/08* (2023.01)
*G06F 16/245* (2019.01)
(Continued)

(52) U.S. Cl.
CPC ............. *G06N 3/08* (2013.01); *G06F 40/284* (2020.01); *G06N 5/04* (2013.01); *G06F 16/245* (2019.01)

(58) Field of Classification Search
CPC .......... G06N 3/08; G06N 5/04; G06N 3/0442; G06N 3/045; G06N 3/044; G06N 3/048;
(Continued)

(56) References Cited

U.S. PATENT DOCUMENTS 10,540,442 B2   1/2020   Beller et al.
11,481,560 B2   10/2022  Nishida et al.
(Continued)

FOREIGN PATENT DOCUMENTS

CN        106776649 A    5/2017
CN        110442675 A    11/2019
(Continued)

OTHER PUBLICATIONS

Sun, K. et al., "Improving Machine Reading Comprehension with General Reading Strategies", https://arxiv.org/abs/1810.13441 (Year: 2019).*
(Continued)

*Primary Examiner* — Alexey Shmatov
*Assistant Examiner* — Devika S Maharaj
(74) *Attorney, Agent, or Firm* — Stosch Sabo

(57) ABSTRACT

A method of using a computing device to improve an answer generated by a natural language question and answer system includes receiving, by a computing device, multiple questions in a natural language question and answer system. The computing device further generates multiple answers to the multiple questions. The computing device still further constructs a new training set with the generated multiple answers, where each answer is compared with a corresponding question of the multiple questions. The computing device additionally augments the new training set with one or more tokens delimiting a span of one or more of the generated multiple answers. The computing device further trains a new natural language question and answer system with the augmented new training set.

14 Claims, 10 Drawing Sheets

(51) Int. Cl.
   G06F 40/284     (2020.01)
   G06N 5/04       (2023.01)
(58) Field of Classification Search
   CPC ...... G06N 3/0455; G06N 3/0464; G06N 3/09;
            G06F 40/284; G06F 20/284; G06F
            16/245; G06F 40/289; G06F 40/35; G06F
                                              40/216
   See application file for complete search history.

(56)                References Cited

U.S. PATENT DOCUMENTS

| | | |
|---|---|---|
| 2007/0196804 A1 | 8/2007 | Yoshimura et al. |
| 2018/0137433 A1 | 5/2018 | Devarakonda et al. |
| 2018/0196921 A1 | 7/2018 | Devarakonda et al. |
| 2019/0163789 A1 | 5/2019 | Ackermann et al. |
| 2019/0236085 A1* | 8/2019 | Galitsky ............... G06N 5/022 |
| 2019/0311064 A1 | 10/2019 | Chakraborty et al. |
| 2019/0347297 A1 | 11/2019 | Galitsky |
| 2020/0285704 A1 | 9/2020 | Rajani et al. |
| 2020/0372341 A1* | 11/2020 | Asai ........................ G06N 3/045 |
| 2021/0150152 A1* | 5/2021 | Galitsky ................. G06F 40/56 |
| 2021/0174023 A1* | 6/2021 | Gao ........................ G06F 40/35 |

FOREIGN PATENT DOCUMENTS

| | | |
|---|---|---|
| CN | 111046158 A | 4/2020 |
| CN | 111460089 A | 7/2020 |
| CN | 111563167 A | 8/2020 |
| CN | 114996513 A | 9/2022 |
| CN | 116324929 A | 6/2023 |
| DE | 112021005782 T5 | 9/2023 |
| GB | 2614861 A | 7/2023 |
| JP | 2007-219955 A | 8/2007 |
| JP | 2019-079437 A | 5/2019 |
| JP | 2020-522044 A | 7/2020 |
| JP | 2023-547802 A | 11/2023 |
| KR | 102100951 B1 | 4/2020 |
| WO | 2018/208979 A1 | 11/2018 |
| WO | 2019/106965 A1 | 6/2019 |
| WO | 2020/180518 A1 | 9/2020 |
| WO | 2022/095713 A1 | 5/2022 |

OTHER PUBLICATIONS

Zhang, Z. et al., "Retrospective Reader for Machine Reading Comprehension", https://arxiv.org/abs/2001.09694v3, Sep. 11, 2020 (Year: 2020).*

Joshi, M. et al., "SpanBERT: Improving Pre-training by Representing and Predicting Spans", https://arxiv.org/abs/1907.10529, Jan. 18, 2020 (Year: 2020).*

Response to the United Kingdom Examination Report filed Aug. 3, 2023 for U.K. Patent Application No. GB2305949.6 with the UK Intellectual Property Office, pp. 1-3, United Kingdom.

United Kingdom Examination Report filed Aug. 23, 2023 for U.K. Patent Application No. GB2305949.6 with the UK Intellectual Property Office, pp. 1-3, United Kingdom.

Yang, Y. et al., "Machine Reading Comprehension Using Data Validation for Weakly Labeled Data," Jan. 2020, pp. 5667-5677, vol. 8,01, IEEE, United States.

Mell et al., "The NIST Definition of Cloud Computing," National Institute of Standards and Technology Special Publication 800-145, Sep. 2011, 7 pages.

Back, S. et al., "NeurQuRI: Neural question requirement inspector for answerability prediction in machine reading comprehension," In International Conference on Learning Representations, Sep. 25, 2019, pp. 1-14, United States.

Hu, M., et al., "Read + Verify: Machine Reading Comprehension with Unanswerable Questions", The Thirty-Third AAAI Conference on Artificial Intelligence, Jul. 17, 2019, pp. 6529-6537, vol. 33, United States.

Zhang, Z. et al., "Retrospective reader for machine reading comprehension", Jan. 27, 2020, pp. 1-5, arXiv preprint arXiv:2001.09694, United States.

Puri, R. et al., "Training Question Answering Models From Synthetic Data", arXiv preprint arXiv:2002.09599., Feb. 22, 2020, pp. 1-13.

Lu, A., "Semi-Supervised Question Answering: Generative Augmentation in SQuAD2.0", Stanford University, Dec. 31, 2019, pp. 1-7, United States.

Glass, M. et al., "Span Selection Pre-training for Question Answering", arXiv preprint arXiv:1909.04120, Sep. 9, 2019, pp. 1-10, IBM Research AI 2 Dept. of CSA, IISC, Bangalore.

International Search Report & Written Opinion dated Jan. 19, 2022 for International Application PCT/CN2021/125325 from National Intellectual Property Administration, pp. 1-9, Beijing China.

United Kingdom Examination Report dated Jun. 12, 2023 for U.K. Patent Application No. GB2305949.6 from the UK Intellectual Property Department, pp. 1-5, South Wales, United Kingdom.

The State Intellectual Property Office of People's Republic of China, "First Office Action", Mar. 28, 2025, 17 Pages, CN Application No. 202180071355.8.

Japan Patent Office, "Notice of Reasons for Refusal" May 1, 2025, 06 Pages, JP Application No. 2023-522789.

* cited by examiner

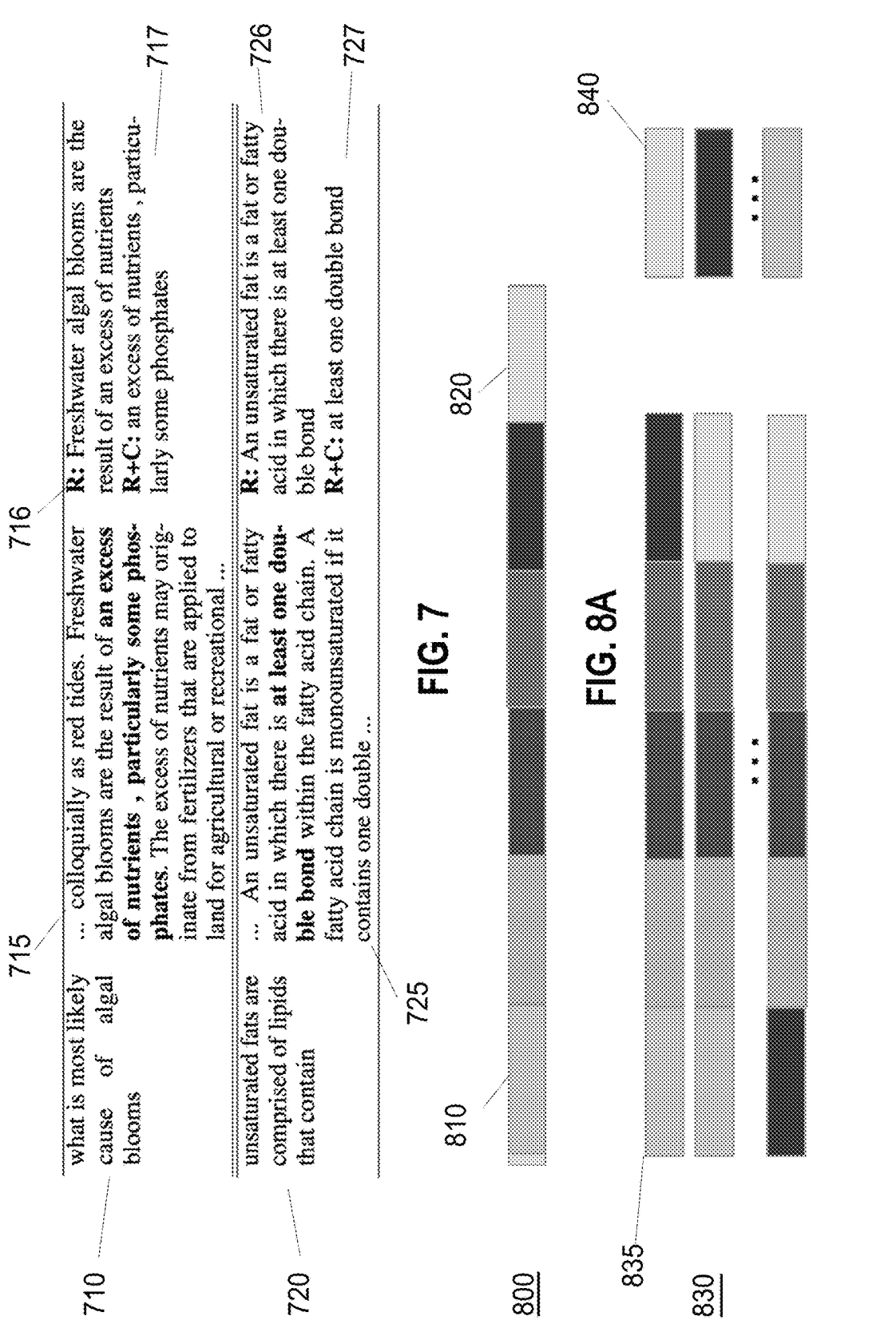

710

715  what is most likely cause of algal blooms that contain

716  ... colloquially as red tides. Freshwater algal blooms are the result of an excess of nutrients , particularly some phosphates. The excess of nutrients may originate from fertilizers that are applied to land for agricultural or recreational ...

717  R: Freshwater algal blooms are the result of an excess of nutrients R+C: an excess of nutrients , particularly some phosphates

720

725  unsaturated fats are comprised of lipids that contain

726  ... An unsaturated fat is a fat or fatty acid in which there is at least one double bond within the fatty acid chain. A fatty acid chain is monounsaturated if it contains one double ...

727  R: An unsaturated fat is a fat or fatty acid in which there is at least one double bond R+C: at least one double bond

| Model | Dev | Test |
|---|---|---|
| Roberta Reader | 61.2 | 62.4 |
| Ensemble of two Readers | 62.1 | - |
| Reader + Corrector | 62.8 | 63.7 |

1005
1006
1007

1020

| Model | En-Context | | G-XLT | |
|---|---|---|---|---|
| | Dev | Test | Dev | Test |
| mBERT Reader | 47.5 | 45.6 | 35.0 | 34.7 |
| + Corrector | 48.3 | 46.4 | 35.5 | 35.3 |

1025          1030

| q\c | en | es | hi | vi | de | ar | zh |
|---|---|---|---|---|---|---|---|
| en | 0.2↑ | ↓0.1 | ↓0.2 | ↓0.4 | ↓0.1 | ↓0.1 | ↓0.3 |
| es | 0.9↑ | ↓0.2 | ↓0.1 | 0.2↑ | 0.8↑ | 0.5↑ | 1.4↑ |
| hi | 0.8↑ | 0.8↑ | 0.8↑ | 0.8↑ | 0.6↑ | 0.4↑ | 0.2↑ |
| vi | 0.9↑ | 1.7↑ | 0.7↑ | 0.3↑ | 1.3↑ | 0.9↑ | 0.5↑ |
| de | 1.7↑ | 0.6↑ | ↓0.1 | 0.6↑ | 0.1↑ | 1.3↑ | 0.9↑ |
| ar | 0.5↑ | 1.0↑ | 0.4↑ | 0.7↑ | 0.9↑ | 0.5↑ | 0.4↑ |
| zh | 0.9↑ | 0.1↑ | 0.9↑ | 0.8↑ | 1.3↑ | 0.4↑ | 0.3↑ |
| AVG | 0.8↑ | 0.6↑ | 0.3↑ | 0.4↑ | 0.7↑ | 0.6↑ | 0.5↑ |

1040

Figure 11:
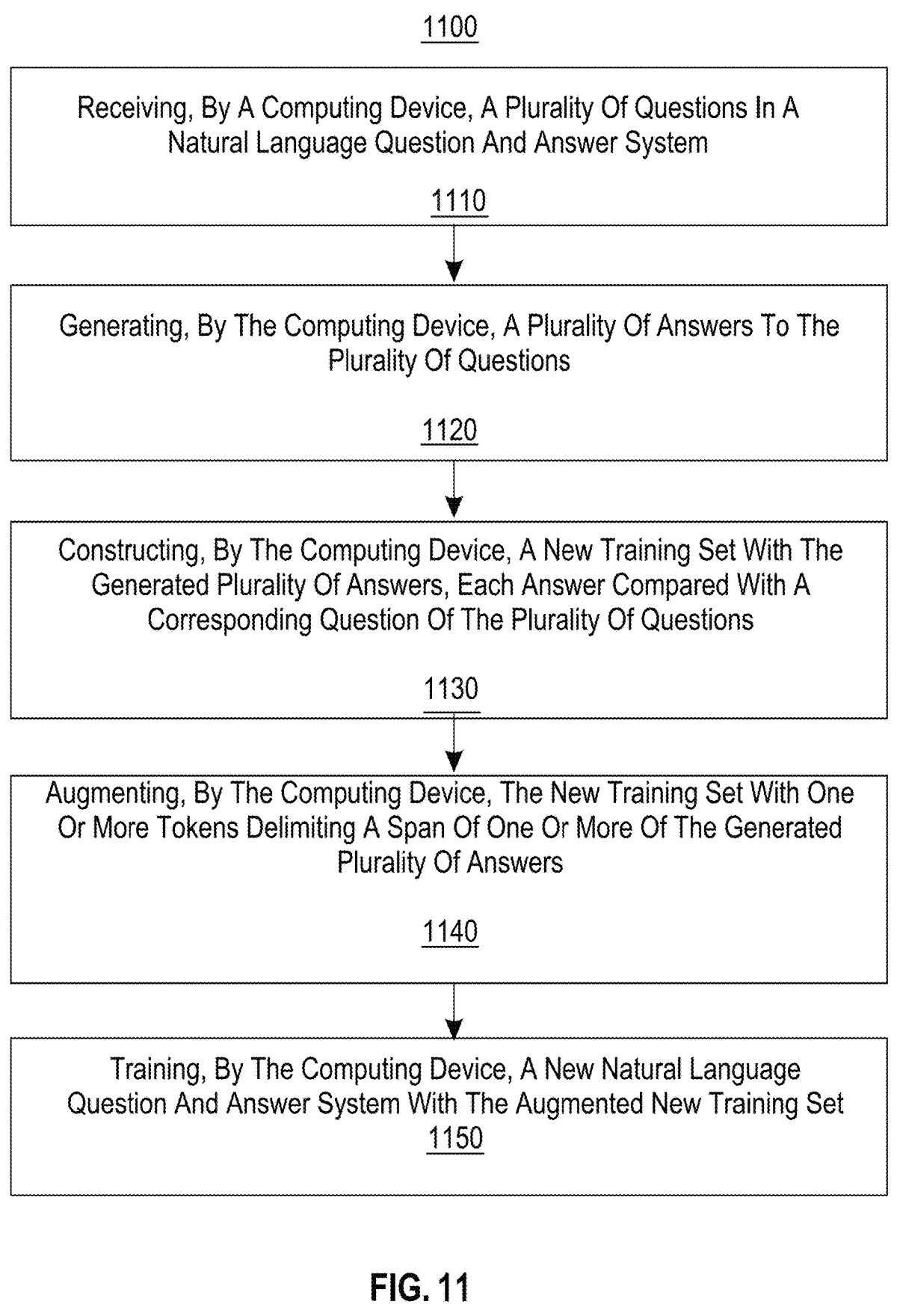

1100

Receiving, By A Computing Device, A Plurality Of Questions In A Natural Language Question And Answer System

1110

Generating, By The Computing Device, A Plurality Of Answers To The Plurality Of Questions

1120

Constructing, By The Computing Device, A New Training Set With The Generated Plurality Of Answers, Each Answer Compared With A Corresponding Question Of The Plurality Of Questions

1130

Augmenting, By The Computing Device, The New Training Set With One Or More Tokens Delimiting A Span Of One Or More Of The Generated Plurality Of Answers

1140

Training, By The Computing Device, A New Natural Language Question And Answer System With The Augmented New Training Set

ANSWER SPAN CORRECTION

BACKGROUND

The field of embodiments of the present invention relates to answer span correction for machine reading comprehension (MRC) models and systems.

Answer validation in machine reading comprehension (MRC) consists of verifying an extracted answer against an input context and question pair. Conventional systems address re-assessing the "answerability" of the question given the extracted answer. Conventional MRC systems have the tendency to produce partially correct answers when presented with answerable questions.

SUMMARY

Embodiments relate to answer span correction for machine reading comprehension (MRC) models and systems. One embodiment provides a method of using a computing device to improve an answer generated by a natural language question and answer system. The method includes receiving, by a computing device, multiple questions in a natural language question and answer system. The computing device further generates multiple answers to the multiple questions. The computing device still further constructs a new training set with the generated multiple answers, where each answer is compared with a corresponding question of the multiple questions. The computing device additionally augments the new training set with one or more tokens delimiting a span of one or more of the generated multiple answers. The computing device further trains a new natural language question and answer system with the augmented new training set. The embodiments significantly improve predictions of a state-of-the-art English-language reader in different error categories via correction. For MRC systems, some features contribute to the advantage of correction of answers as there is a tendency of existing MRC systems to produce partially correct answers when presented with answerable questions. Some features contribute to the advantage of detecting errors in an MRC model's predictions and corrects them. Further, the features contribute to the advantage of producing answer spans that better match the ground truth (GT), and therefore improve the quality of MRC output answers.

One or more of the following features may be included. In some embodiments, an answer span of a reader model of the natural language question and answer system is corrected using the augmented new training set for the new natural language question and answer system.

In some embodiments, the new natural language question and answer system that corrects the answer span is cascaded after the natural language question and answer system.

In one or more embodiments, the method may further include determining, by the new natural language question and answer system that corrects the answer span, whether the answer span should be corrected. Still further, a corrector model of the new natural language question and answer system corrects the answer span based producing an improved answer span.

In some embodiments, the method may additionally include that the corrector model uses a neural network for generating the improved answer span.

In one or more embodiments, the method may include creating, for a determination that the answer span should not be corrected, new example answers from each original answer of the plurality of answers based on delimiting a GT answer as an input to the new natural language question and answer system, indicating no need for correction.

In some embodiments, the method may further include using a plurality of top k incorrect answer predictions to create an example answer for each incorrect answer prediction, wherein the input is the reader model's predicted answer span and a target answer is the GT answer.

In one or more embodiments, the method may additionally include that the generated plurality of answers comprises predicted answers, and the one or more tokens mark the predicted plurality of answers in context for predicting new answers by the corrector model.

These and other features, aspects and advantages of the present embodiments will become understood with reference to the following description, appended claims and accompanying figures.

BRIEF DESCRIPTION OF THE DRAWINGS

FIG. 7 shows examples of single answer results from a reader (given a question and context) from a conventional MRC model or system, and also answer results (given the question and the context) from a reader plus corrector pipeline, according to one embodiment;

FIG. 8A shows a representative example of training data for a conventional MRC model or system divided into folds;

FIG. 8B shows a representative example of how n−1 individual folds are grouped for training separate MRC models, which are used for generating predictions on the remaining fold, according to one embodiment;

FIG. 11 illustrates a block diagram of a process for answer span correction for performance improvement for MRC, according to one embodiment.

DETAILED DESCRIPTION

Figure 1:
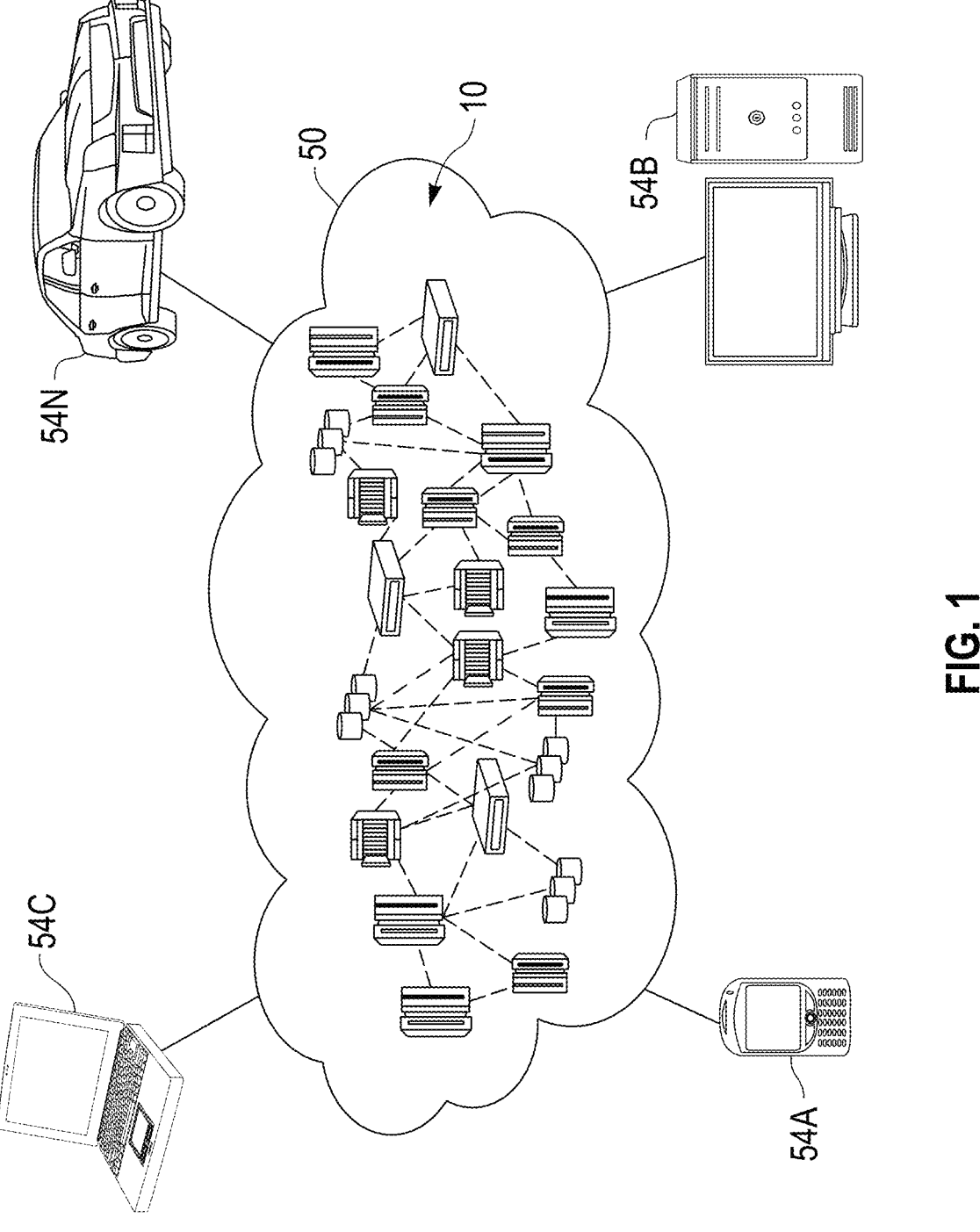
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to answer span correction for machine reading comprehension (MRC) models and systems. One embodiment provides a method using a computing device to improve an answer generated by a natural language question and answer system includes receiving, by a computing device, multiple questions in a natural language question and answer system. The computing device further generates multiple answers to the multiple questions. The computing device still further constructs a new training set with the generated multiple answers, where each answer is compared with a corresponding question of the multiple questions. The computing device additionally augments the new training set with one or more tokens delimiting a span of one or more of the generated multiple answers. The computing device further trains a new natural language question and answer system with the augmented new training set.

One or more embodiments include a corrector (e.g., corrector 960 (FIG. 9)) that employs an artificial intelligence (AI) model. AI models may include a trained ML model (e.g., models, such as a NN, a convolutional NN (CNN), a recurrent NN (RNN), a Long short-term memory (LSTM) based NN, gate recurrent unit (GRU) based RNN, tree-based CNN, self-attention network (e.g., an NN that utilizes the attention mechanism as the basic building block; self-attention networks have been shown to be effective for sequence modeling tasks, while having no recurrence or convolutions), BiLSTM (bi-directional LSTM), etc.). An artificial NN is an interconnected group of nodes or neurons.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
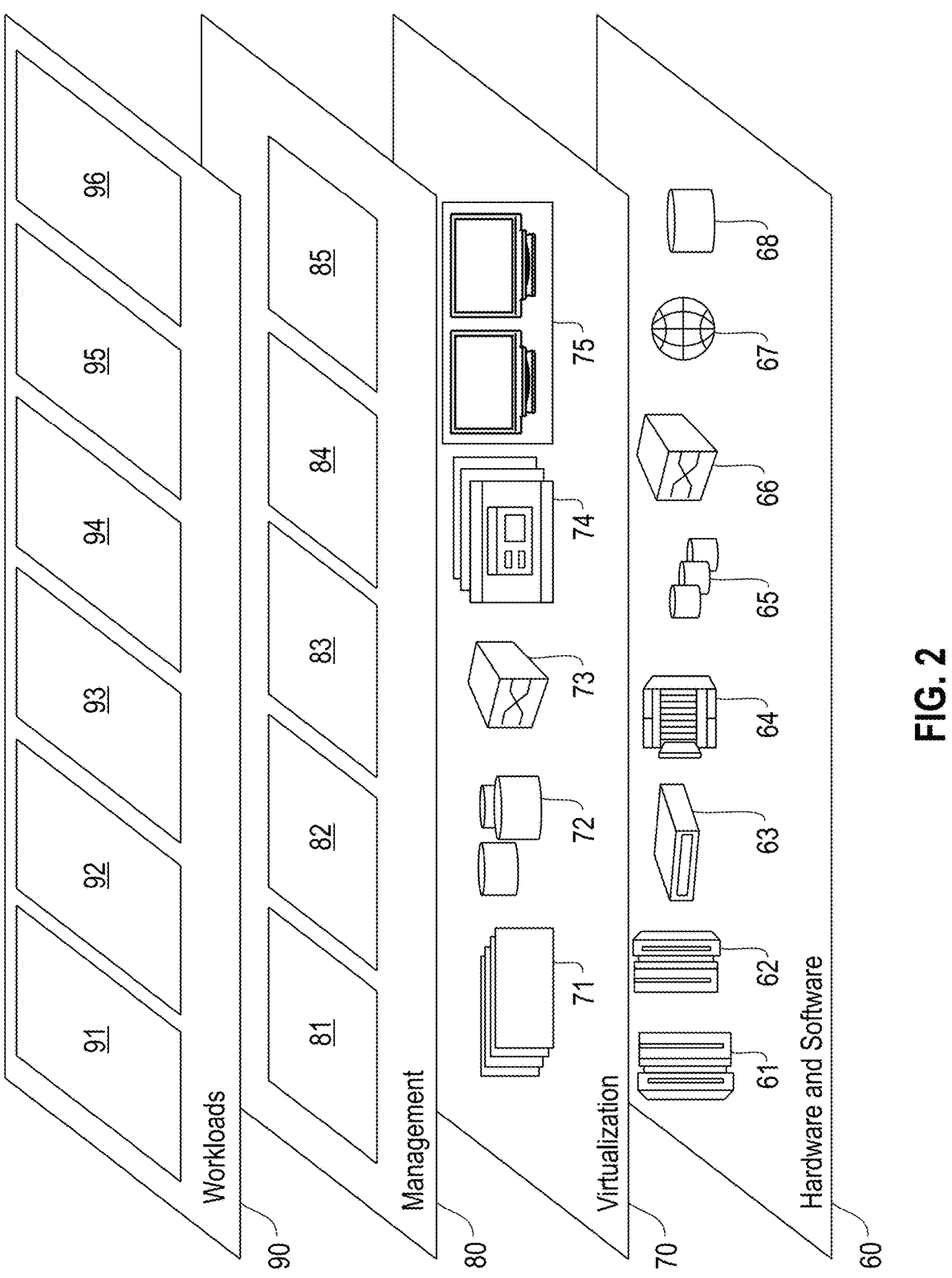
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for answer span correction for performance improvement for MRC processing 96 (see, e.g., system 500, FIG. 5, a reader plus corrector pipeline (modified MRC answer corrector model 900), and process 1100, FIG. 11). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
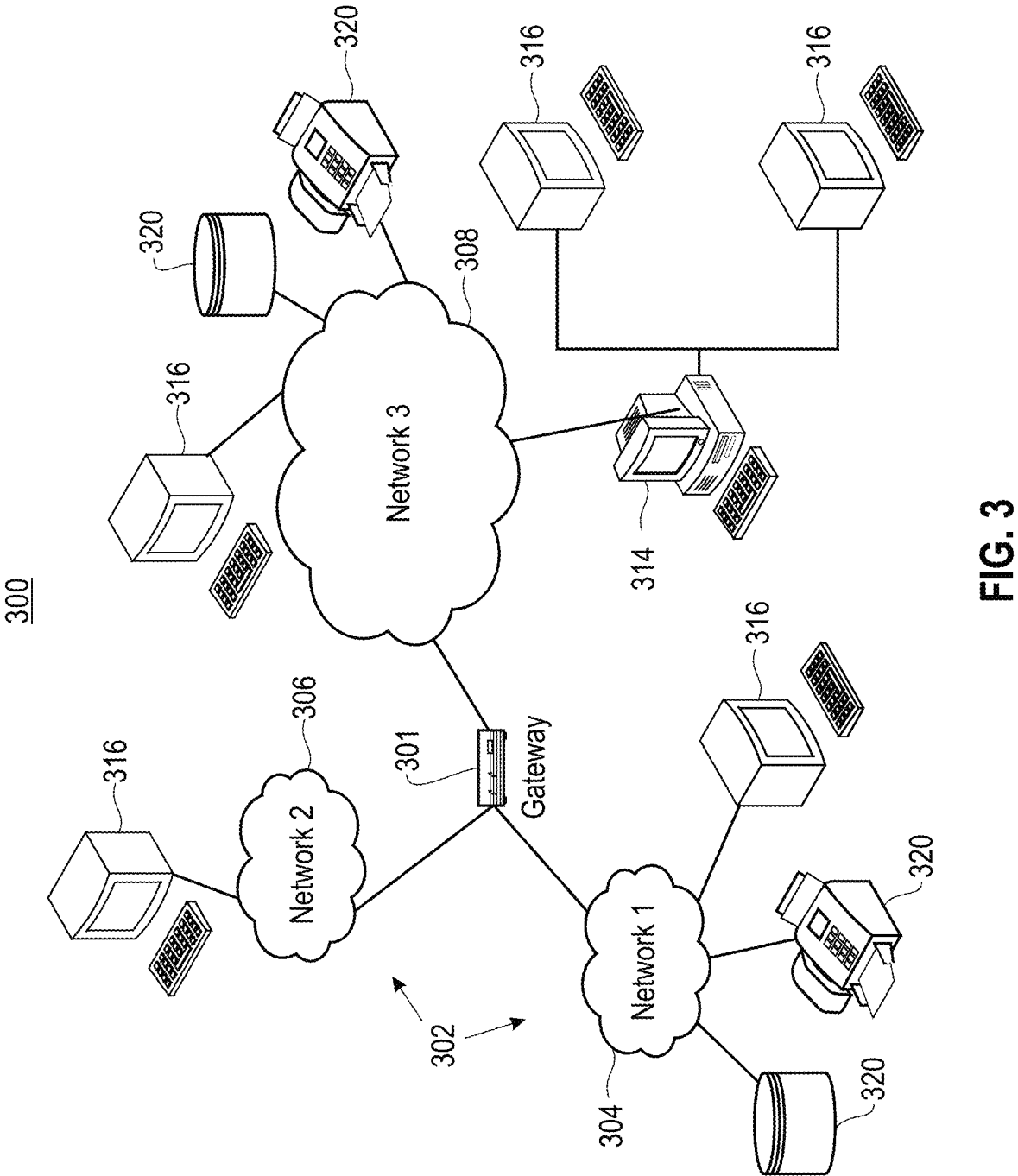
FIG. 3 is a network architecture of a system for answer span correction for performance improvement for machine reading comprehension (MRC), according to an embodiment.

FIG. 3 is a network architecture of a system 300 for answer span correction for performance improvement for MRC models, according to an embodiment, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT® WINDOWS® environment, a MICROSOFT® WINDOWS® system that emulates an IBM® z/OS environment, etc. This virtualization and/or emulation may be implemented through the use of VMWARE® software in some embodiments.

Figure 4:
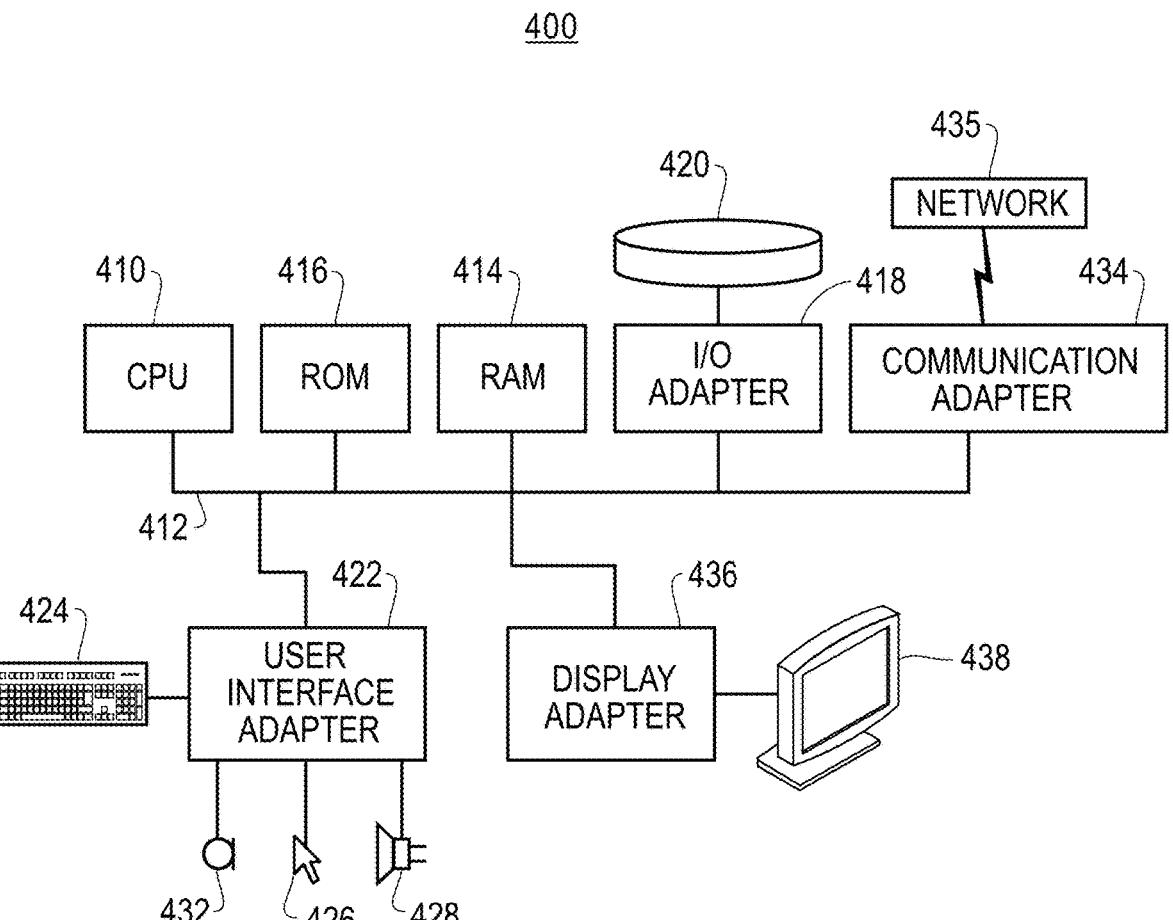
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a micropro-cessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communi-cation network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OSX, a UNIX OS, etc. In one embodiment, the system 400 employs a POSIX® based file system. It will be appreciated that other examples may also be implemented on platforms and oper-ating systems other than those mentioned. Such other examples may include operating systems written using JAVA®, XML, C, and/or C++ language, or other program-ming languages, along with an object oriented programming methodology. Object oriented programming (OOP), which has become increasingly used to develop complex applica-tions, may also be used.

Figure 5:
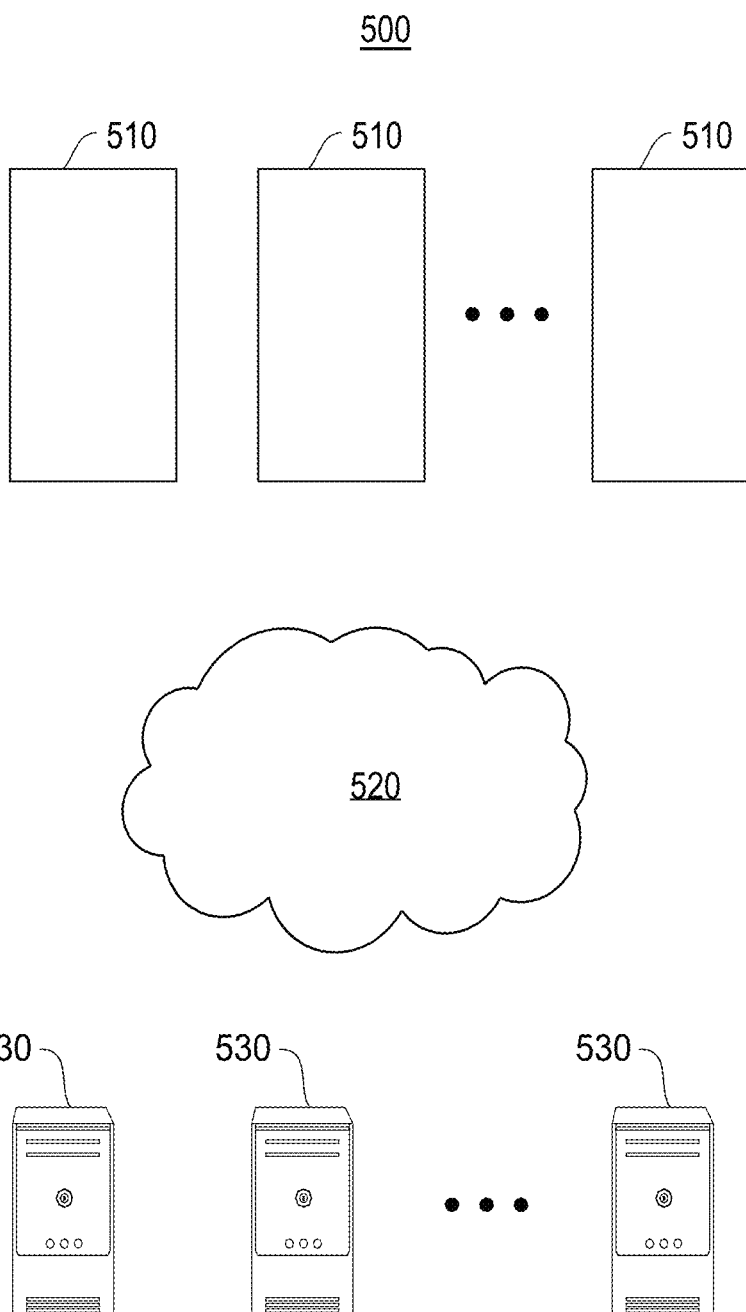
FIG. 5 is a block diagram illustrating a distributed system for answer span correction for performance improvement for MRC, according to one embodiment.

FIG. 5 is a block diagram illustrating a distributed system 500 for answer span correction for performance improve-ment for MRC models, according to one embodiment. In one embodiment, the system 500 includes client devices 510 (e.g., mobile devices, smart devices, computing systems, etc.), a cloud or resource sharing environment 520 (e.g., a public cloud computing environment, a private cloud com-puting environment, a data center, etc.), and servers 530. In one embodiment, the client devices 510 are provided with cloud services from the servers 530 through the cloud or resource sharing environment 520.

Instead of improving the prediction of answerability of a question given an extracted answer addressed by conven-tional systems, one or more embodiments address the prob-lem of the tendency of existing MRC systems to produce partially correct answers when presented with answerable questions. One embodiment provides an AI correction model that re-examines the extracted answer in context to suggest corrections. One embodiment builds training data for training such AI correction model, using the same labeled data from which the MRC model is trained. Accord-ing to one embodiment, a corrector detects errors in an MRC model's predictions and also corrects the detected errors.

Figure 6:
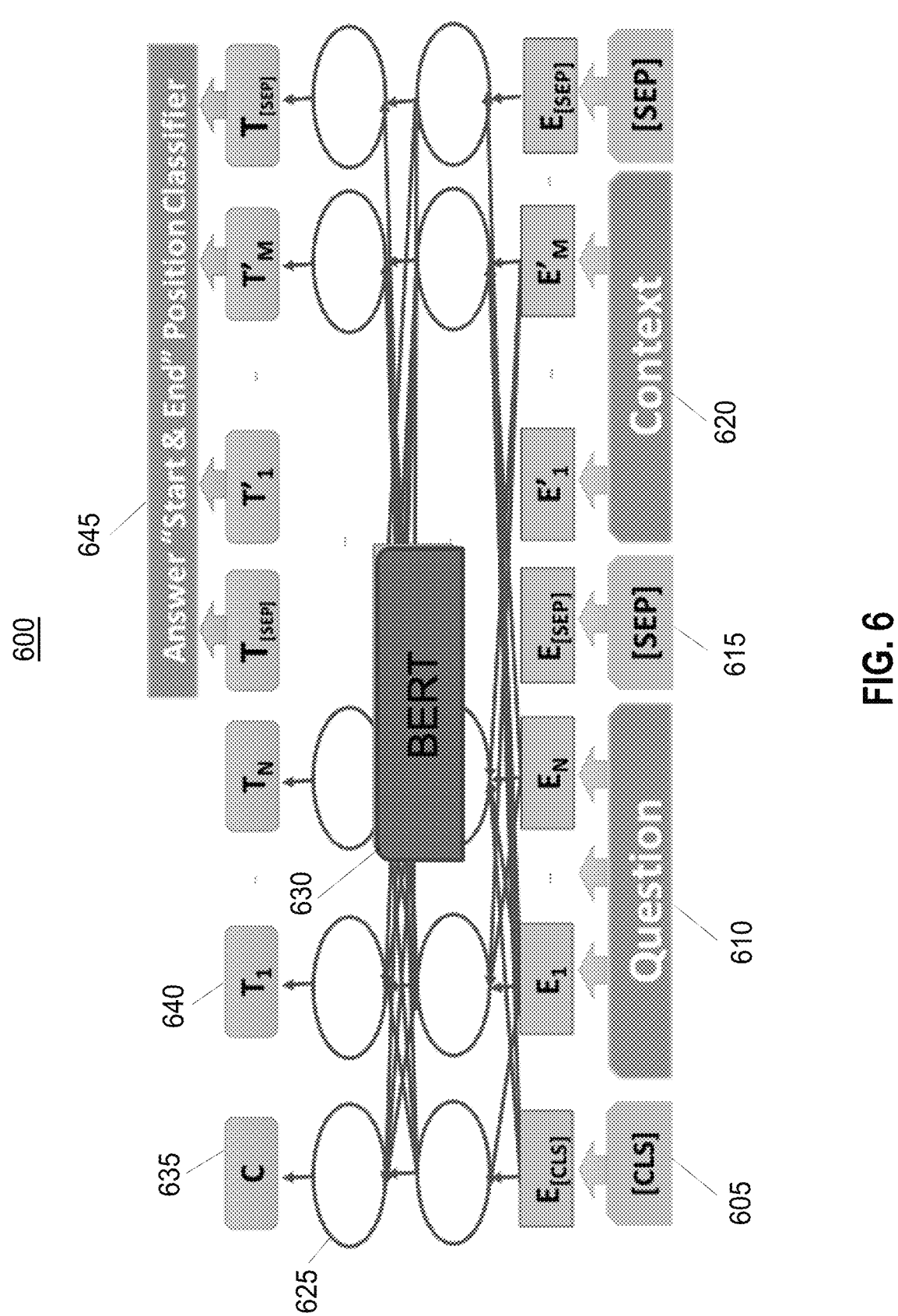
FIG. 6 shows an example of a multi-layer bidirectional transformer encoder (BERT) MRC system.

FIG. 6 shows an example of a multi-layer bidirectional transformer encoder (BERT) model 630 MRC system 600. The BERT model 630 is a multi-layer bidirectional transformer encoder. Traditional neural machine translation mainly uses RNN or CNN as the model base of an encoder-decoder architecture. An attention-based transformer model abandons the traditional RNN and CNN formula. The atten-tion mechanism is a form of fuzzy memory that includes the hidden state of the model. The model chooses to retrieve content from memory. The attention mechanism reduces this problem by allowing the decoder to look back at the source sequence hidden state, and then provide its weighted aver-age as an additional input to the decoder. Using Attention, the model selects the context that best fits the current node as input during the decode phase. The transformer model uses the encoder-decoder architecture. The BERT model 630 is a deep, two-way DNN model. The BERT model 630 applies the bidirectional training of a transformer to lan-guage modeling. A transformer includes an encoder that reads the text input and a decoder that produces a prediction for the task. There are two phases to using the BERT model 630: pre-training and fine-tuning. During pre-training, the BERT model 630 is trained on unlabeled data over different pre-training tasks. For fine-tuning, the BERT model 630 is first initialized with the pre-trained parameters, and all of the parameters are fine-tuned using labeled data from the down-stream tasks. Each downstream task has separate trans-former (fine-tuned) models 625, even though they are ini-tialized with the same pre-trained parameters.

The BERT model 630 pre-training phase includes a masked language model and next sentence prediction. For the masked language model due to bi-directionality and the effect of the multi-layer self-attention mechanism that the BERT model 630 uses, in order to train a deep bidirectional representation, a percentage (e.g., 15%) of the input tokens are masked at random, and then the masked tokens are predicted. The final hidden vectors corresponding to the mask tokens are fed into an output softmax function (a softmax function turns a vector of K real values into a vector of K real values that sum to 1) over the vocabulary, as in a standard language model. The masked language model target allows to represent the context of the left and right sides of the fusion, which makes it possible to pre-train the deep two-way transformer. The BERT model 630 loss function takes into consideration only the prediction of the masked values and ignores the prediction of the non-masked words. For next sentence prediction, the BERT model 630 also pre-trains for a binarized next sentence prediction task that can be very easily generated from any text corpus. To help the BERT model 630 distinguish between two sen-tences in training, the input is processed before entering the BERT model 630 as follows. A classification [CLS] token 605 is inserted at the beginning of a question 610 (i.e., first sentence or sentence A) and a separation [SEP] token 615 is inserted at the end of the question 610 and context (second sentence or sentence B) 620. A sentence embedding (E) indicating question 610 or context 620 is added to each token (e.g., $E_{[CLS]}$, $E_{[SEP]}$). A positional embedding (e.g., $E_1$-$E_N$, $E'_1$-$E'_M$)) is added to each token to indicate its position in the sequence.

To predict if the context 620 is connected to the question 610, the entire input sequence proceeds through the trans-former models 625. The output of the [CLS] token 605 is transformed into a 2×1 shaped vector, using a classification layer (learned matrices of weights and biases). The prob-ability of IsNextSequence is determined with the softmax function. For each downstream natural language processing (NLP) task, the task specific inputs and outputs are fed into the BERT model 630 and all the parameters are fine-tuned end-to-end. At the input, question 610 and context 620 from pre-training can be analogous to sentence pairs in paraphrasing, hypothesis-premise pairs in entailment, question-passage pairs in question answering, etc. At the output, the token representations are fed into an output layer for token level tasks, such as sequence tagging or question answering, and the [CLS] representation is fed into an output layer for classification (e.g., to output a class label C 635). The output layer includes the transformer outputs $T_1$-$T_N$ 640, and $T_{[SEP]}$, $T'_1$-$T'_M$, and $T_{[SEP]}$, which are the answer "Start & End" span position classifier 645.

FIG. 7 shows examples of single answer results from a reader (e.g., reader 930, FIG. 9; given a question and context) from a conventional MRC system, and also answer results (given the question and the context) from a reader plus corrector pipeline (MRC answer span corrector model 900 (FIG. 9)), according to one embodiment. The first example includes a question 710, a result in context 715, an answer result from the reader with context (R) 716 and answer result with context from the reader plus corrector pipeline (R+C) 717. The second example includes a question 720, a result in context 725, R 726 and R+C 727.

FIG. 8A shows a representative example 800 of training data for a conventional MRC model or system divided into folds. The training data is divided or parsed into n folds, $fold_1$ 810 to $fold_n$ 820.

FIG. 8B shows a representative example 830 of how n-1 individual folds 835 are grouped for training separate MRC models (n MRC answer span corrector models 900 (FIG. 9)), which are used for generating predictions on the remaining fold 840, according to one embodiment. The n MRC answer span corrector models 900 are trained on n-1 (n is an integer≥2) different folds each, and generate predictions with them on the remaining fold 840. Combining the results from the n different models on the left-out folds produces an example of system output for each example in the training set. These [question-context-true answer-system answer] tuples are the base for constructing the training set for the answer span corrector models 900.

Figure 9:
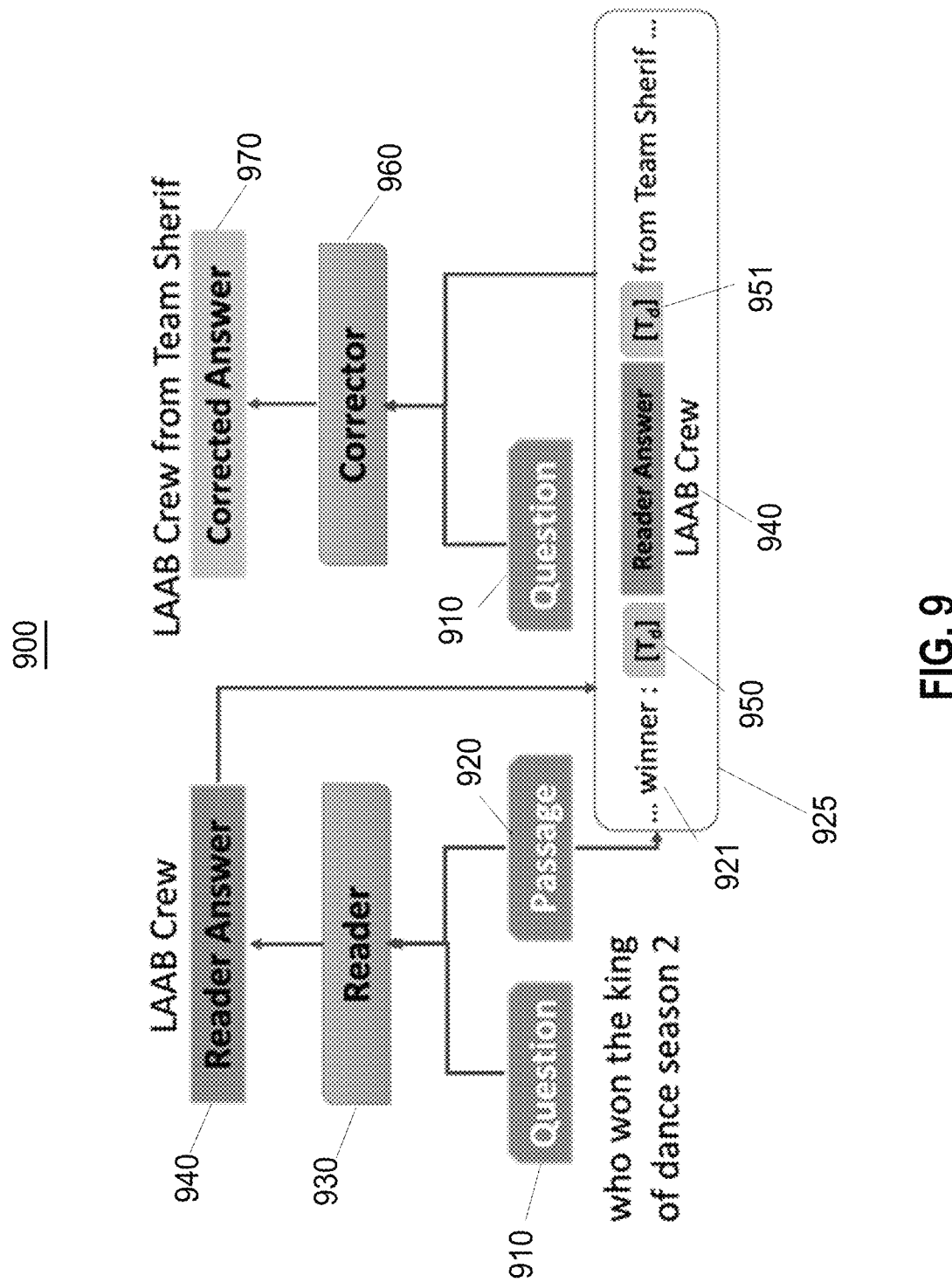
FIG. 9 illustrates a block diagram of a flow for a reader plus corrector pipeline of a modified MRC answer span corrector model, according to one embodiment.

FIG. 9 illustrates a block diagram of a flow for a reader plus corrector pipeline of a modified MRC answer span corrector model 900, according to one embodiment. In one embodiment, the output of the reader model 930 is input to the corrector (or corrector model) 960. In one embodiment, the MRC model (the reader model 930) includes a transformer-like encoder with two additional classification heads that select the beginning and end of the answer span, respectively. In this embodiment, the answer span corrector (the corrector 960) also has a similar architecture. The corrector 960 is trained with different data than the reader 930. The modified MRC answer span corrector model 900 re-examines the reader answer 940 (extracted answer) in context to suggest corrections to address the related problem of improving the answer span and output the corrected answer 970. In one embodiment, the reader answer 940 is delimited with special delimiter tokens, $[T_d]$ 950 and $[T_d]$ 951, and employ a corrector 960 (with architecture similar to that of the original reader 930) that is trained to produce a new accurate prediction.

In one embodiment, the reader 930 is a baseline reader for the standard MRC task of answer extraction from a passage 920 given a question 910. The reader 930 uses two classification heads on top of a pre-trained transformer-based language model, pointing to the start and end positions of the answer span. The entire network is then fine-tuned on the target MRC training data. In one embodiment, the input to the corrector 960 contains the delimiter tokens $[T_d]$ 950 and $[T_d]$ 951 marking the boundaries of the reader's prediction (reader answer 940), while the remaining architecture is similar as the reader 930 input. In one embodiment, it is desired that the modified MRC answer span corrector model 900 keeps answers that already match the ground truth (GT) span intact and correct the rest.

In one embodiment, to generate training data for the corrector 960, the reader 930 predictions are needed for the training set. To obtain the reader 930 predictions, one embodiment divides or parses the training set into five folds (see, e.g., example 830, FIG. 8B), train the reader 930 on four (i.e., n–1) of the folds and obtain predictions on the remaining fold 840. This process is repeated five times to produce reader predictions (reader answer 940) for all (question, answer) pairs in the training set. The training examples for the corrector 960 are generated using these reader predictions (reader answer 940) and the original GT annotations. To create examples that do not require correction, a new example 921 is created from each original example (passage 920) where the GT answer itself is delimited in the input, indicating no need for correction. For examples that need correction, the reader 930 top k incorrect predictions (where k is a hyperparameter) are used to create an example for each, where the input 925 is the reader 930 predicted span and the target is the GT. The presence of both GT (correct) and incorrect predictions in the input data ensures that the corrector 960 learns both to detect errors in the reader 930 predictions and to correct them.

Figures 10A, 10B, 10C:
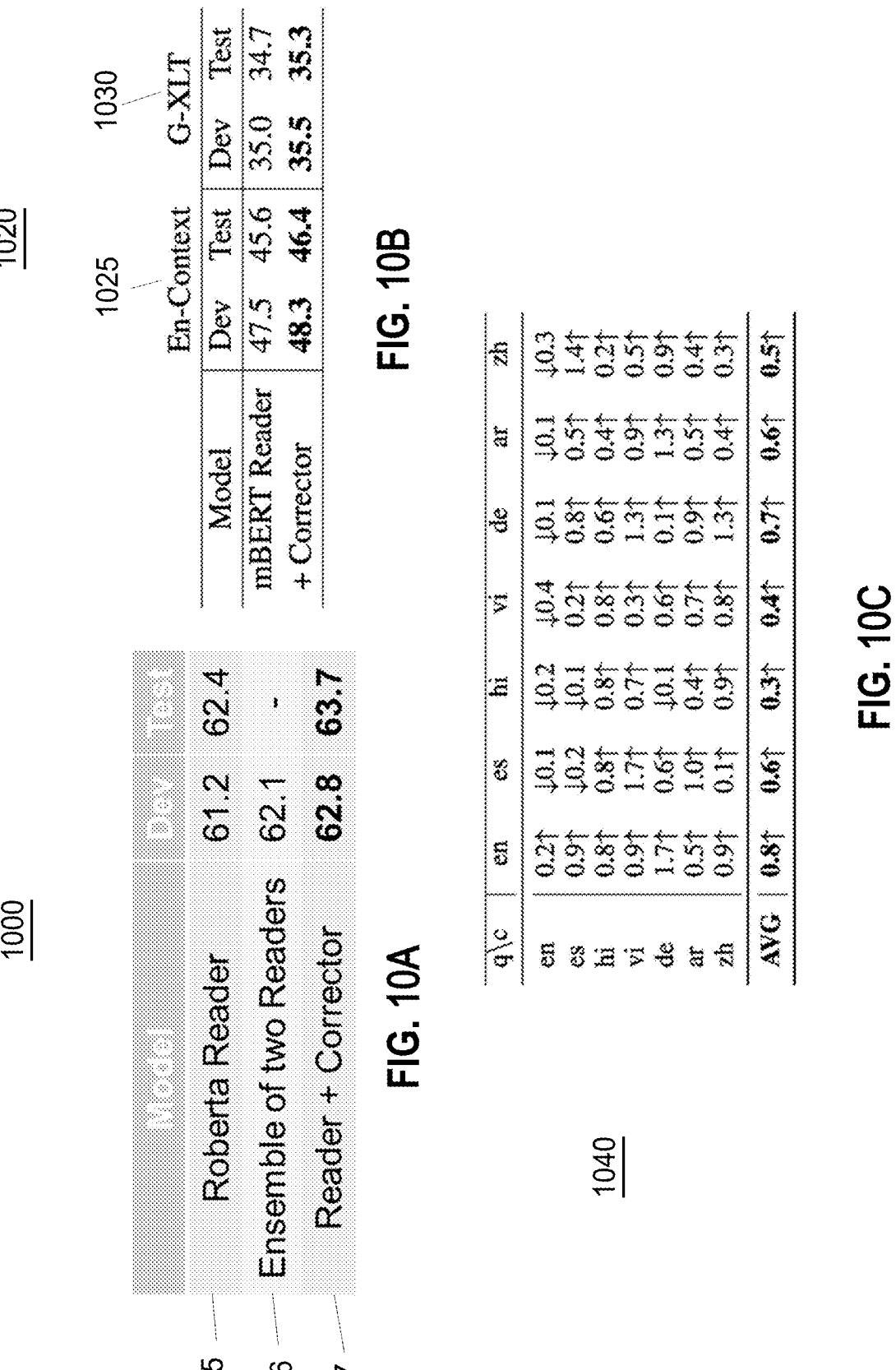
FIG. 10A shows a table including results on answerable questions for Natural Questions (NQ) MRC benchmark for a robustly-optimized BERT approach (ROBERTa), an ensemble of two readers approach and an approach using a reader plus corrector pipeline (or modified MRC answer span corrector model) shown in FIG. 9, according to one embodiment.
FIG. 10B shows a table including results on Multilingual Question Answering (MLQA) MRC benchmark dataset using the reader plus corrector pipeline (the modified MRC answer span corrector model shown in FIG. 9) when a paragraph is in English and for a generalized cross-lingual transfer task (G-XLT), according to one embodiment.
FIG. 10C shows a table including the differences in exact match scores for all 49 MLQA language pair combinations from using the reader plus corrector pipeline (modified MRC answer span corrector model), according to one embodiment.

FIG. 10A shows a table 1000 including results 1005 on answerable questions for Natural Questions (NQ) MRC benchmark for a robustly-optimized BERT approach (ROBERTa), results 1006 for an ensemble of two readers approach and results 1007 for an approach using a reader plus corrector pipeline (or the modified MRC answer span corrector model 900 shown in FIG. 9), according to one embodiment. In one example embodiment, the modified MRC answer span corrector model 900 is evaluated on the answerable questions in the development (dev) and test sets. To compute an exact match on answerable test set questions, a system is used that always outputs an answer and took the recall value from the leaderboard. MLQA (Multilingual Question Answering) includes instances in seven (7) languages: English (en), Arabic (ar), German (de), Spanish(es), Hindi (hi), Vietnamese (vi) and Simplified Chinese (zh).

The NQ and MLQA readers fine-tune a ROBERTa large and an mBERT (cased, 104 languages) language model, respectively. The ROBERTa model is first fine-tuned on SQUAD2.0 and then on NQ. The results show that training on both answerable and unanswerable questions yields a stronger and more robust reader, even though it is evaluated on answerable-only questions. The modified MRC answer span corrector model 900 uses the same underlying transformer language model as the corresponding ROBERTa reader. While creating training data for the modified MRC answer span corrector model 900, to generate examples that need correction, the two (k=2) highest scoring incorrect reader predictions (the value of k was tuned on dev) are used. Since the goal is to fully correct any inaccuracies in the ROBERTA reader's prediction, an exact match (EM) is used as the evaluation metric. In one embodiment, the modified MRC answer span corrector model 900 uses a common architecture for the reader 930 and the corrector 960, but their parameters are separate and independently learned. To compare with an equally sized baseline, an ensemble system for NQ that averages the output logits (not yet normalized predictions) of two different ROBERTa readers. The results in table 1000 are obtained by averaging over three seeds. The results 1007 outperformed the ensemble of readers results 1006 by 0.7 in the dev test. These results confirm that the correction objective complements the reader's extraction objective well and is fundamental to the overall performance gain for the modified MRC answer span corrector model 900. The results on the answerable questions of NQ shows that the results 1007 for the modified MRC answer span corrector model 900 improves upon the results 1005 of the ROBERTa reader approach by 1.6 points on the dev set and 1.3 points on the blind test set.

FIG. 10B shows a table 1020 including results on the MLQA MRC benchmark dataset using the reader plus corrector pipeline (the modified MRC answer span corrector model 900 shown in FIG. 9) when a paragraph is in English and for a generalized cross-lingual transfer task (G-XLT), according to one embodiment. Performances in two settings are compared: one with the paragraph in English and the question in any of the seven languages (En-Context results 1025), and the other being the G-XLT results 1030, where performance is the average over all forty-nine (49) (question, paragraph) language pairs involving the seven languages (English, Arabic, German, Spanish, Hindi, Vietnamese and Simplified Chinese). For MLQA, a Fisher randomization test is used on the exact match numbers of the 158*k* example test set to verify the statistical significance of the results. It can be seen in table 1020 that the reader plus corrector pipeline (modified MRC answer span corrector model 900) performed significantly better than the baseline reader at $p<0:01$.

FIG. 10C shows a table 1040 including the differences in exact match scores for all 49 MLQA language pair combinations from using the reader plus corrector pipeline (the modified MRC answer span corrector model 900 with the corrector 960 (FIG. 9)), according to one embodiment. The results in table 1040 show changes in the exact match with the corrector 960 for all the language pair combinations in the MLQA test set. The final row of table 1040 shows the gain for each paragraph language averaged over questions in different languages. On average, the corrector 960 gives performance gains for paragraphs in all languages (last row). The highest gains are observed in English contexts, which is expected as the corrector 960 model is trained to correct English answers in context. However, it is also found that the approach of the reader plus corrector pipeline (the modified MRC answer span corrector model 900) generalizes well to the other languages in a zero-shot setting as exact match improves in 40 of the 49 language pairs.

In one embodiment, the changes made by the corrector 960 of the reader plus corrector pipeline (modified MRC answer span corrector model 900) to the reader's predictions on the NQ dev set show that overall, 13% of the reader model predictions. Of all changes, 24% resulted in the correction of an incorrect or a partially correct answer to a GT answer and 10% replaced the original correct answer with a new correct answer (due to multiple GT annotations in NQ). In 57% of the cases, the change did not correct the error. On a closer look, however, it is observed that the F1 score (measure of a test's accuracy) increased in more of these cases (30%) compared to when it dropped (15%). Finally, 9% of the changes introduced an error in a correct reader prediction.

In one embodiment, the percentage of errors corrected in each of three error categories: partial coverage, verbosity and overlap, are 9%, 38% and 22% corrected, respectively. Corrections were made in all categories, but more in verbosity and overlap than in partial coverage, pointing to the possibility that the corrector 960 (FIG. 9) learns the concepts of minimality and syntactic structure better than adequacy.

In one embodiment, processing using the reader plus corrector pipeline (modified MRC answer span corrector model 900 (FIG. 9)) corrects the predictions of a state-of-the-art English-language reader 930 in different error categories. In the experiments using one embodiment, the approach also generalizes well to multilingual and cross-lingual MRC in seven languages.

FIG. 11 illustrates a block diagram of a process 1100 for answer span correction for performance improvement for MRC, according to one embodiment. In one embodiment, in block 1110, process 1100 receives, by a computing device (from computing node 10, FIG. 1, hardware and software layer 60, FIG. 2, processing system 300, FIG. 3, system 400, FIG. 4, system 500, FIG. 5, reader plus corrector pipeline (modified MRC answer span corrector model 900, FIG. 9), etc.) multiple questions in a natural language question and answer system (e.g., the MRC model including the reader 930, FIG. 9). In block 1120, process 1100 further generates, by the computing device, multiple answers to the multiple questions. In block 1130, process 1100 further constructs a new training set with the generated multiple answers, where each answer is compared with a corresponding question of the multiple questions. In block 1140, process 1100 additionally augments, by the computing device, the new training set with one or more tokens delimiting a span of one or more of the generated multiple answers. In block 1150, process 1100 additionally trains a new natural language question and answer system (e.g., the reader plus corrector pipeline or modified MRC answer span corrector model 900 with corrector 960, FIG. 9) with the augmented new training set.

In one embodiment, process 1100 may further include the feature that an answer span of a reader model (e.g., reader 930, FIG. 9) of the natural language question and answer system is corrected using the augmented new training set for the new natural language question and answer system.

In one embodiment, process 1100 may additionally include the feature that the new natural language question and answer system that corrects the answer span is cascaded after the natural language question and answer system.

In one embodiment, process 1100 may still additionally include the feature of determining, by the new natural language question and answer system that corrects the answer span, whether the answer span should be corrected. Still further, a corrector model (e.g., corrector 960, FIG. 9) of the new natural language question and answer system corrects the answer span based producing an improved answer span.

In one embodiment, process 1100 may yet additionally include that the corrector model uses a neural network for generating the improved answer span.

In one embodiment, process 1100 may further include the feature of creating, for a determination that the answer span should not be corrected, new example answers from each original answer of the plurality of answers based on delimiting a GT answer as an input to the new natural language question and answer system, indicating no need for correction.

In one embodiment, process 1100 may still further include the feature of using a plurality of top k incorrect answer predictions to create an example answer for each incorrect answer prediction, where the input is the reader model's predicted answer span and a target answer is the GT answer.

In one embodiment, process 1100 may include the feature that the generated plurality of answers comprises predicted answers, and the one or more tokens mark the predicted plurality of answers in context for predicting new answers by the corrector model.

In some embodiments, the features described above contribute to the advantage of significantly improving the predictions of a state-of-the-art natural language reader in different error categories via correction. For MRC systems, some features contribute to the advantage of correction of answers as there is a tendency of existing MRC systems to produce partially correct answers when presented with answerable questions. Some features further contribute to the advantage of detecting errors in an MRC model's predictions and corrects the detected errors. Further, the features contribute to the advantage of producing answer spans that improve matching of the GT, and therefore improving the quality of MRC output answers.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A computer-implemented method comprising:
pre-training a multi-layer bidirectional transformer encoder using a masked language model and next sentence prediction by:
randomly masking a percentage of input tokens in pre-training data;
inputting final hidden input vectors corresponding to the percentage of input tokens that are randomly masked to an output softmax function, and wherein a loss function utilizes only predictions of the percentage of input tokens that are randomly masked while ignoring predictions of non-masked tokens;
inserting a classification token at a beginning of a question in the pre-training data;
inserting a separation token at an end of the question in the pre-training data;

applying a sentence embedding indicating the question to the classification token and the separation token; and
applying a positional embedding to the classification token and the separation token;
receiving a plurality of questions in a natural language question and answer system;
generating, by a reader model using two classification heads of the multi-layer bidirectional transformer encoder, a plurality of answers to the plurality of questions, wherein the reader model generates the plurality of answers by:
parsing a training set of multiple questions into n multiple folds;
training the reader model on n−1 of the multiple folds;
generating predictions of questions in a remaining fold; and
repeating the parsing, training, and generating n times to produce the plurality of answers to the plurality of questions;
constructing a new training set with the plurality of answers, each answer compared with a corresponding question of the plurality of questions;
augmenting the new training set with one or more tokens delimiting a span of one or more of the plurality of answers, wherein the span marks boundaries of the plurality of answers within training data; and
training a new natural language question and answer system with the new training set, wherein the new natural language question and answer system corrects an answer span of the reader model using the new training set, wherein a corrector model of the new natural language question and answer system corrects the answer span to produce an improved answer span, and wherein the corrector model uses a neural network for generating the improved answer span.

2. The method of claim 1, further comprising:
cascading the new natural language question and answer system that corrects the answer span after the natural language question and answer system.

3. The method of claim 1, further comprising:
creating, for a determination that the answer span should not be corrected, new example answers from each original answer of the plurality of answers based on delimiting a ground truth (GT) answer as an input to the new natural language question and answer system, indicating no need for correction.

4. The method of claim 3, further comprising:
using a plurality of top k incorrect answer predictions to create an example answer for each incorrect answer prediction, wherein the input is the reader model's predicted answer span and a target answer is the GT answer.

5. The method of claim 1, wherein the plurality of answers comprises a predicted plurality of answers, and the one or more tokens mark the predicted plurality of answers in context for predicting new answers by the corrector model.

6. A computer program product comprising a computer readable storage medium having program instructions embodied therewith, the program instructions executable by a processor to cause the processor to:
pre-train a multi-layer bidirectional transformer encoder using a masked language model and next sentence prediction by:
randomly masking a percentage of input tokens in pre-training data;

inputting final hidden input vectors corresponding to the percentage of input tokens that are randomly masked to an output softmax function, and wherein a loss function utilizes only predictions of the percentage of input tokens that are randomly masked while ignoring predictions of non-masked tokens;

inserting a classification token at a beginning of a question in the pre-training data;

inserting a separation token at an end of the question in the pre-training data;

applying a sentence embedding indicating the question to the classification token and the separation token; and applying a positional embedding to the classification token and the separation token;

receive a plurality of questions in a natural language question and answer system;

generate, by a reader model using two classification heads of the multi-layer bidirectional transformer encoder, a plurality of answers to the plurality of questions, wherein the reader model generates the plurality of answers by:

parsing a training set of multiple questions into n multiple folds;

training the reader model on n−1 of the multiple folds;

generating predictions of questions in a remaining fold; and repeating the parsing, training, and generating n times to produce the plurality of answers to the plurality of questions:

construct a new training set with the plurality of answers, each answer compared with a corresponding question of the plurality of questions;

augment the new training set with one or more tokens delimiting a span of one or more of the plurality of answers, wherein the span marks boundaries of the plurality of answers within training data; and train a new natural language question and answer system with the new training set, wherein the new natural language question and answer system corrects an answer span of the reader model using the new training set, wherein a corrector model of the new natural language question and answer system corrects the answer span to produce an improved answer span, and wherein the corrector model uses a neural network for generating the improved answer span.

7. The computer program product of claim 6, wherein the program instructions executable by the processor further cause the processor to:

cascade, by the processor, the new natural language question and answer system that corrects the answer span after the natural language question and answer system.

8. The computer program product of claim 6, wherein the program instructions executable by the processor further cause the processor to:

create for a determination that the answer span should not be corrected, by the processor, new example answers from each original answer of the plurality of answers based on delimiting a ground truth (GT) answer as an input to the new natural language question and answer system, indicating no need for correction.

9. The computer program product of claim 8, wherein the program instructions executable by the processor further cause the processor to:

using, by the processor, a plurality of top k incorrect answer predictions to create an example answer for each incorrect answer prediction, wherein the input is the reader model's predicted answer span and a target answer is the GT answer.

10. The computer program product of claim 6, wherein the plurality of answers comprises a predicted plurality of answers, and the one or more tokens mark the predicted plurality of answers in context for predicting new answers by the corrector model.

11. An apparatus comprising:

a memory configured to store instructions; and a processor configured to execute the instructions to:

pre-train a multi-layer bidirectional transformer encoder using a masked language model and next sentence prediction by:

randomly masking a percentage of input tokens in pre-training data;

inputting final hidden input vectors corresponding to the percentage of input tokens that are randomly masked to an output softmax function, and wherein a loss function utilizes only predictions of the percentage of input tokens that are randomly masked while ignoring predictions of non-masked tokens;

inserting a classification token at a beginning of a question in the pre-training data;

inserting a separation token at an end of the question in the pre-training data;

applying a sentence embedding indicating the question to the classification token and the separation token; and applying a positional embedding to the classification token and the separation token;

receive a plurality of questions in a natural language question and answer system;

generate, by a reader model using two classification heads of the multi-layer bidirectional transformer encoder, a plurality of answers to the plurality of questions, wherein the reader model generates the plurality of answers by:

parsing a training set of multiple questions into n multiple folds;

training the reader model on n−1 of the multiple folds;

generating predictions of questions in a remaining fold; and repeating the parsing, training, and generating n times to produce the plurality of answers to the plurality of questions;

construct a new training set with the plurality of answers, each answer compared with a corresponding question of the plurality of questions;

augment the new training set with one or more tokens delimiting a span of one or more of the plurality of answers, wherein the span marks boundaries of the plurality of answers within training data; and train a new natural language question and answer system with the new training set, wherein the new natural language question and answer system corrects an answer span of the reader model using the new training set, wherein a corrector model of the new natural language question and answer system corrects the answer span to produce an improved answer span, and wherein the corrector model uses a neural network for generating the improved answer span.

12. The apparatus of claim 11, wherein the processor is further configured to execute the instructions to:

cascade the new natural language question and answer system that corrects the answer span after the natural language question and answer system.

13. The apparatus of claim 11, wherein the processor is further configured to execute the instructions to:

create for a determination that the answer span should not be corrected, new example answers from each original answer of the plurality of answers based on delimiting a ground truth (GT) answer as an input to the new natural language question and answer system, indicating no need for correction; and using a plurality of top k incorrect answer predictions to create an example answer for each incorrect answer prediction, wherein the input is the reader model's predicted answer span and a target answer is the GT answer.

14. The apparatus of claim 11, wherein the plurality of answers comprises a predicted plurality of answers, and the one or more tokens mark the predicted plurality of answers in context for predicting new answers by the corrector model.

* * * * *